Patented Dec. 8, 1931

1,835,365

UNITED STATES PATENT OFFICE

FRANK O. WOODRUFF, OF QUINCY, MASSACHUSETTS, ASSIGNOR TO HARRY H. BECKWITH, OF BROOKLINE, MASSACHUSETTS

RUBBER COMPOUND AND PROCESS FOR MAKING THE SAME

No Drawing. Application filed March 17, 1928. Serial No. 262,586.

This application is a continuation-in-part of my copending application Serial No. 198,009, filed June 10, 1927. The invention relates to a rubber product and method of making, an object of the invention being to increase the quantity of the coagulated product obtainable from a given quantity of an aqueous dispersion of rubber, such as latex. Latex is a term applied to certain juices extracted from a considerable number of different trees, these juices in each case being capable of yielding some kind of rubber. Of these trees, the one of principal importance is known as *Hevea brasiliensis*, this yielding a latex from which the well known Pará rubber is derived. Latex from this tree consists of a natural colloidal dispersion of rubber globules in a watery vehicle, and contains about 34 to 39 per cent. of solids, depending on conditions such as season, age of tree, etc. The rubber globules are believed to consist of a core of terpene represented by the chemical symbol $(C_5H_8)_n$ surrounded by a coating of proteid matter. The watery vehicle in which the rubber particles are suspended also contains proteids which apparently keep the rubber globules separate. These proteids are subject to decomposition and putrefaction so that if it is desired to transport the latex or to keep it for more than a day or two, it is necessary to add a preservative such as a small quantity of ammonia or formalin. In preparing rubber for industrial uses, the globules of rubber may be coagulated in the latex by any of a number of methods which are supposed to break down or destroy the agencies in the latex which tend to keep the globules separate. It is an object of the present invention to increase the yield from latex by mixing with the latex substances which will react chemically to form in situ a suitable diluent or filler for the rubber, the reaction being preferably of a nature to result in the simultaneous coagulation of the rubber and filler in a homogeneous mass having physical characteristics closely resembling those of pure coagulated rubber. The characteristics of the coagulum may of course be widely varied by modifying the different steps of the process. In carrying out my invention, I preferably add to latex (taken directly from the tree or preserved with ammonia), a quantity of a suitable oil, such as a drying oil, an essential oil, or a mixture of oils, or a colloid, such as glue, gelatine, gum or the like, or a suitable mineral oil such as kerosene or petrolatum. Other substances, such for example as resins, can also be used successfully. The substances which can be employed with latex to carry out the invention are thus too diversified to be designated by any significant inclusive term. Such substances are therefore hereinafter referred to in the specification and claims as "diluents", it being understood that this term as hereinafter used applied only to such substances as can be successfully used and chemically combined with a reactant and with the solids of the latex according to the invention to obtain a coagulum of the substance with the rubber in the latex, the physical characteristics of which closely resemble a pure rubber coagulum. In order to obtain a product containing the rubber and the diluent, and having physical characteristics closely resembling those of coagulated rubber, I prefer to coagulate the mixture by the use of a reagent which may under suitable conditions react chemically with the latex and added diluent in such a way as to bring about a complete combined coagulation of all the rubber and diluent in the mixture. For this purpose, I may employ a reagent such as an aldehyde,—formaldehyde, furfural, benzaldehyde and acetaldehyde being specific examples of material which are found suitable for the purpose. I am not certain just what the nature of the reaction is, but the aldehyde appears to join or combine the molecules of rubber with molecules of the oil or colloid in a sort of agglomeration or condensation product which at present is not wholly understood. Taking an essential oil, for example, it is found that an aldehyde in the proportions used successfully for coagulating an oil-latex mixture has no thickening effect whatever on the oil alone, nor will such a proportion of the aldehyde coagulate the latex alone. The mixture of the oil and latex, however, is coagulated to an elastic rubber-like mass which is cohesive and non-sticky, a clear watery serum being separated therefrom. On the other hand, if acid, such as acetic, is used as a coagulant with an oil-latex mixture, the resulting product is a sticky pasty mass having none of the characteristics of ordinary coagulated rubber. The action of acid on a mixture of latex with a gum is to coagulate the rubber alone, leaving the gum in solution in the residual serum, whereas by following the process described hereinafter, the rubber and gum can be coagulated together into a rubber-like mass, leaving no gum in the residual serum. It may be that a chemical reaction between the colloid or oil and the aldehyde forms nascent substances which act catalytically to coagulate the rubber. But regardless of whether the coagulation of the rubber is mechanical as well as chemical, a satisfactory product may be obtained by carrying out the following detailed process, it being understood that the process described is by way of illustration only and is not to be considered as limiting the invention to the particular ingredients, the precise proportions thereof or the manipulation and treatment thereof.

A quantity of latex is taken containing an ascertained weight of rubber. To this latex is gradually stirred in a quantity of oil, preferably a drying oil or an essential oil, or a mixture of oils. The amount of oil taken is preferably about equal to the weight of rubber in the latex taken. The oil and latex are thoroughly mixed at room temperature. To this mixture is slowly added a small quantity of a 40 per cent. solution of an aldehyde such as formaldehyde, furfural, benzaldehyde, or acetaldehyde, while the mixture is being stirred. At this point, the mixture may be warmed slightly or not at all according to the nature of the oil used. If tung oil is employed, no warming is required, ordinary room temperature being sufficient for the reaction. After the warming, if any, enough aldehyde solution is added to make the total equal about 1½ per cent. to 2½ per cent. of the combined weights of the rubber in the latex and of the oil, the stirring being continued. If a drying oil or an essential oil be used, or a mixture of such oils, coagulation thereupon takes place without further application of heat, the coagulation being relatively sudden and in some cases, as with tung oil or rosemary oil, for example, accompanied by a spontaneous rise of about five degrees in temperature. This sudden rise in temperature points clearly to an exothermic chemical reaction involving the rubber, oil and aldehyde, the reaction probably being of the type known as a "condensing reaction" and being accompanied by the generation of water. The coagulum separates out in a cohesive, non-sticky, rubbery mass, the remaining serum being clear and watery with no trace of free oil or uncoagulated rubber globules. When the coagulum is allowed to stand, at room temperature, watery serum which has been entrapped therein spontaneously separates from the mass, as if mechanically forced out under pressure. This serum will pass through a filter paper leaving no deposit thereon. The coagulum obtained is, after drying, approximately double the weight of the rubber in the latex taken and has the characteristics of a true rubber. It can be milled, vulcanized and otherwise treated like pure rubber, its properties of tenacity, elasticity and the like approximating those of pure rubber products of the highest grade, but varying somewhat according to the particular kind of oil or colloid combined with the rubber. If desired, vulcanizing substances such as sulphur, zinc oxide, accelerators, etc., may be mixed with the latex and oil prior to coagulation. The presence of these substances does not interfere with the coagulation but since they are uniformly distributed through the coagulum, the step of milling the rubber is thus obviated, with a resultant saving of power and time.

The use of an oil diluent according to the invention also facilitates the coloring of the rubber with oil-soluble dyes. The dye is dissolved in the oil prior to its mixture with the latex. When the mixture is coagulated, all the dye is found in the coagulum, the serum being colorless. This results in a uniform distribution of a fixed and permanent dye throughout the mass of coagulated rubber.

In addition to the increased product which can be obtained at low cost by the use of an oil or colloid diluent, I have found that other advantages may be had by using certain types of oils. For example, if a drying oil such as tung or linseed oil be used, mixed with about 5 per cent. or so of an essential oil such as rosemary, clove, cedar or the like, the resulting coagulum not only has an agreeable odor but is preserved and protected by the essential oil against molding and deteriorating. The preservative action of the essential oil is a valuable feature of the coagulated product since the latter may be thus shipped with little danger of deterioration in transit.

If a diluent other than a drying oil of an essential oil be used, it will be necessary in most cases to warm the mixture of latex and diluent in order to obtain a satisfactory product. A typical example of procedure when using a colloid as a diluent is as follows. To a quantity of latex may be added an aqueous solution of a suitable colloid such as gelatine or a gum. The amount of colloid in the solution may for example equal approximately the amount of rubber in the latex. The colloid solution should preferably be of about the same concentration as the latex and should be added gradually to the latex while the latter is constantly stirred. Both the latex and the colloid should preferably be cold, i. e., at room temperature, during the mixing. When all of the colloid solution has been added to the latex and stirred in thoroughly, the mixture is warmed to about 100° F. and a 40 per cent. solution of formaldehyde may be added gradually while the mixture is stirred until the latter begins to form in soft lumps. This will require in the present instance an amount of solution equal to about 1½ per cent. to 2½ per cent. of the combined weight of the solids in the mixture. Further stirring should smooth out the lumps. The mixture is then heated and stirred until coagulation occurs, this taking place at a temperature of about 140° F. The coagulum should include all of the rubber and added colloid in a single cohesive mass, none of either being left in the serum. The coagulum is washed thoroughly with water and dried. After partial drying, it may be shredded and dried completely, whereupon it is ready for milling and vulcanization. Various other colloids and proportions of ingredients may be used, the temperature conditions being varied accordingly to give satisfactory results.

The product resulting from my method as illustrated by examples hereinbefore described is probably a rubber containing as a filler or diluent a condensation product. The diluent is so uniformly and intimately associated with the rubber itself that the vulcanized coagulum exhibits the characteristics of ordinary vulcanized rubber, being very cohesive, flexible and elastic. Experiment has shown that, under the proper conditions, a greatly increased yield of rubber product can be obtained from a given quantity of latex, the yield being approximately additive, that is, equal to the combined weights of the rubber constituents of the latex and the oil or colloid.

As hereinbefore stated, the term "diluent" as used in this specification and in the claims refers only to such substances as can be successively employed with latex to carry out the invention and to obtain a satisfactory coagulated product consisting of the rubber originally in the latex combined with the added substance. Thus the term "diluent" as herein used may include vegetable, mineral and animal oils, more especially vegetable drying oils and essential oils as well as mixtures thereof, colloids such as gelatin, gum, glue and cellulosic colloids, and other substances such as resins.

I do not limit myself to the specific examples of my process which have been set forth in detail, but wish to include within the scope of the invention all reasonable equivalents of ingredients used, and a reasonable range of variation of temperatures and proportions.

I claim:—

1. A process of making a rubber-like coagulum, which comprises mixing with latex a quantity of oil approximately equal in weight to the rubber in the latex, and stirring into the mixture a small quantity of an aldehyde.

2. A process of making a rubber-like coagulum, which comprises mixing a quantity of latex with a quantity of oil up to approximately the same weight as that of the rubber in the latex, and adding a quantity of an aldehyde insufficient to coagulate the rubber from the latex alone, but sufficient to coagulate the mixed rubber and oil into a rubber-like mass.

3. A process of making a rubber-like coagulum, which comprises mixing a quantity of latex with a quantity of an oil approximately equal in weight to the rubber in the latex, and adding a quantity of an aldehyde insufficient to coagulate the rubber from the latex alone, but sufficient to coagulate the mixed rubber and oil into a rubber-like mass.

4. A process of making rubber-like coagulum, which comprises mixing with latex a quantity of drying oil approximately equal to the rubber in the latex, and adding to the mixture a quantity of a 40% solution of an aldehyde equivalent to about 2% of the combined weights of the oil and rubber in the mixture.

5. A process of making a rubber-like coagulum, which comprises mixing with latex a quantity of oil approximately equal in weight to the rubber in the latex, and adding a quantity of formaldehyde insufficient to coagulate the latex alone, but sufficient to coagulate the mixture of latex and oil.

6. A process of making a rubber-like coagulum, which comprises mixing with latex a quantity of oil approximately equal in weight to the rubber in the latex, and adding to the mixture a quantity of a 40% solution of formaldehyde equivalent to about 2% of the combined weights of the oil and rubber in the mixture.

7. A process of making a rubber-like coagulum, which comprises mixing latex with a quantity of drying oil approximately equal in weight to the rubber in the latex, and adding to the mixture a quantity of a 40% solution of formaldehyde equivalent to about 2% of the combined weights of the oil and rubber in the mixture.

8. A process of making and preserving a rubber-like coagulum, which comprises mixing latex with a quantity of mixed oils equal in weight to the rubber in the latex, the mixed oils including a relatively small quantity of an essential oil, and adding to the mixture of latex and oils a quantity of a 40% solution of an aldehyde equivalent to about 2% of the combined weights of the oil and rubber in the mixture.

9. A process of making a rubber-like coagulum, which comprises mixing latex with a quantity of oils approximately equal in weight to the rubber in the latex, the oil constituent comprising chiefly a vegetable drying oil, and stirring into the mixture a quantity of a 40% solution of formaldehyde equivalent to about 2% of the combined weights of the oil and rubber in the mixture.

10. A process of making a rubber-like coagulum, which comprises mixing with latex a diluent approximately equal in weight to the rubber in the latex, and stirring into the mixture a quantity of an aldehyde insufficient to coagulate the latex alone, but sufficient to coagulate the mixture of latex and a diluent.

11. A process of making a rubber-like coagulum, which comprises mixing with latex a diluent approximately equal in weight to the rubber in the latex, and stirring into the mixture a quantity of a 40% solution of formaldehyde equivalent to about 2% of the combined weights of the rubber and diluent in the mixture.

12. A permanently rubber-like substance containing rubber and oil in approximately equal proportions by weight combined by aldehydic condensation.

13. A permanently rubber-like substance containing rubber and a vegetable drying oil in approximately equal proportions combined by aldehydic condensation.

14. A permanently rubber-like substance containing rubber and an approximately equal weight of mixed oils including an essential oil combined by aldehydic condensation.

15. A process which comprises mixing an aqueous dispersion of rubber and a diluent capable of being coagulated with the rubber, adding an aldehyde to combine and coagulate the rubber and the diluent, and recovering the coagulum from the aqueous medium.

16. A process which comprises mixing an aqueous dispersion of rubber and an oil, adding an aldehyde to coagulate the rubber and oil, and recovering the coagulum from the aqueous medium.

17. A process which comprises mixing together latex and an oil, adding an aldehyde to coagulate the solids of the latex and the oil, and recovering the coagulum from the aqueous medium.

18. The rubber-like coagulum resulting from the reaction of an aldehyde, an aqueous disperson of rubber and an oil.

19. The rubber-like coagulum resulting from the reaction of an aldehyde with a mixture of dispersed rubber and oil in substantially equal quantities.

20. The rubber-like coagulum resulting from the reaction of an aldehyde with a quantity of latex-contained rubber and a substantially equal quantity of oil.

21. The rubber-like coagulum resulting from the reaction of an aldehyde, an aqueous dispersion of rubber, and a diluent capable of being coagulated and combined with the rubber by an aldehyde.

22. The rubber-like coagulum resulting from the reaction of an aldehyde with a mixture of substantially equal quantities of dispersed rubber and a diluent capable of being coagulated and combined with the rubber by an aldehyde.

23. The rubber-like coagulum resulting from the reaction of an aldehyde, an aqueous dispersion of rubber, and a diluent including a mineral oil.

24. The rubber-like coagulum resulting from the reaction of an aldehyde and a mixture of dispersed rubber and a diluent in substantially equal quantities, said diluent including a mineral oil.

25. The rubber-like coagulum resulting from the reaction of formaldehyde and a mixture of latex-contained rubber and a diluent in substantially equal quantities, said diluent including a mineral oil.

26. The rubber-like coagulum resulting from the reaction of an aldehyde, an aqueous dispersion of rubber, and a diluent including a gum.

27. The rubber-like coagulum resulting from the reaction of an aldehyde and a mixture of dispersed rubber and a diluent in substantially equal quantities, said diluent including a gum.

28. The rubber-like coagulum resulting from the reaction of formaldehyde and a mixture of latex-contained rubber and a diluent in substantially equal quantities, said diluent including a gum.

29. A process which comprises mixing an aqueous dispersion of rubber and a diluent which includes a mineral oil and is capable of being coagulated with the rubber, adding an aldehyde to combine and coagulate the rubber and the diluent, and recovering the coagulum from the aqueous medium.

30. A process which comprises mixing an aqueous disperson of rubber and a diluent which includes a gum and is capable of being coagulated with the rubber, adding an aldehyde to combine and coagulate the rubber and the diluent, and recovering the coagulum from the aqueous medium.

In testimony whereof I have affixed my signature.

FRANK O. WOODRUFF.